R. H. MARTINDALE.
Improvement in Horse Hay-Rakes.

No. 126,314. Patented April 30, 1872.

WITNESSES
E. H. Bates
G. E. Upham

INVENTOR
R. H. Martindale
Chipman Hosmer & Co
Attys 126,314

UNITED STATES PATENT OFFICE.

RALPH H. MARTINDALE, OF HOBBVILLE, INDIANA.

IMPROVEMENT IN HORSE HAY-RAKES.

Specification forming part of Letters Patent No. 126,314, dated April 30, 1872.

*To all whom it may concern:*

Be it known that RALPH H. MARTINDALE, of Hobbville, in the county of Greene and State of Indiana, has invented a new and valuable Improvement in Treadle Hay-Rake; and he does hereby declare that the following is a full, clear, and exact description of the construction and operation of the same, reference being had to the annexed drawing making a part of this specification, and to the letters and figures of reference marked thereon.

Figure 1:
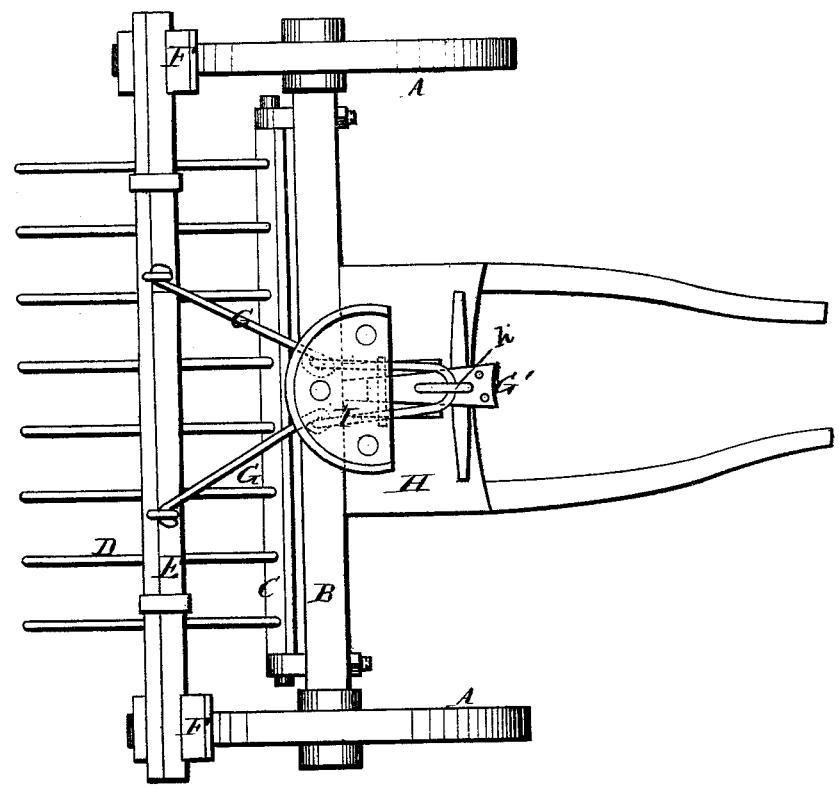
Figure 2:
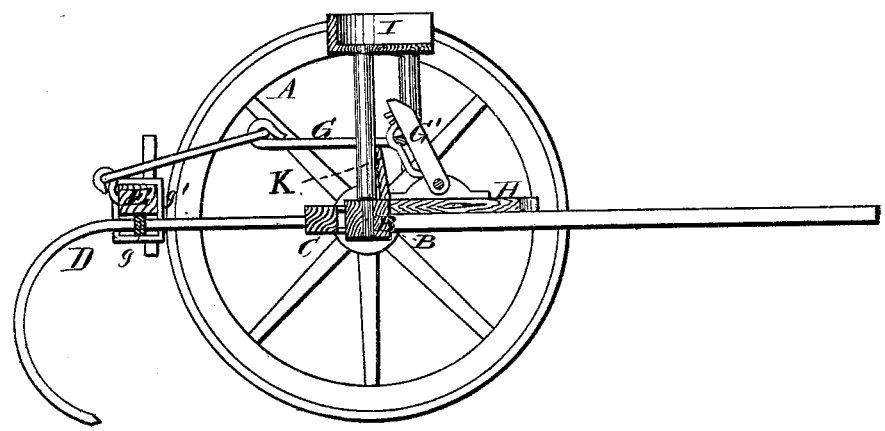

Figure 1 of the drawing is a representation of a plan view of my invention. Fig. 2 is a longitudinal vertical section of the same.

This invention has relation to the attachment of brake-shoes to the lifting-bar of the teeth of horse hay-rakes, and the means of operating the same; and it consists in the construction and novel arrangement of the rocking-bar which carries the brake-shoes, and the elongated staple or slot in the treadle, whereby the brakes are designed to raise the teeth by the force of the revolution of the wheels and the rake is caused to fall suddenly a short distance after reaching the highest point in its course, thus shaking off its load.

In the accompanying drawing, the letter A represents the wheels pivoted to the axle B, which is rigidly attached to the body of the vehicle. C represents a bar hinged to the axle, and provided with the elastic raking-teeth D, extending to the rear and downward in the ordinary hook form. These teeth are connected at their rear portions by means of a bar, $g$, which extends transversely across them. To this bar is connected the lifting-bar E, which is attached to said bar $g$ by means of couplings or bands $g'$ in such a manner that it shall have a certain amount of rocking play. F represents the brake-shoes secured to the ends of the bar E. Staples are secured to the rear upper edge of the bar E, and serve for the attachment of the jointed coupling-rods G, which connect said bar with the treadle-lever G'. This treadle is provided with an elongated staple or wire slot, $h$, which is somewhat expanded at its forward end and extends to the rear in a contracted form, making a shoulder or bend in the rim. K represents a guide-board placed near the seat standard, and designed to serve as a fulcrum or rest for the forward staple-like joint of the coupling G, so that this joint shall be kept as long as possible in the expansion of the slot $h$. It is evident that when the treadle-lever is pushed fully forward and downward, this coupling-joint will slip from the expansion of the slot $h$, past the shoulder or stricture, and travel along the narrow portion thereof to its rear end, causing the rake to take a sudden fall and shake off its load.

When the brake-lever is operated it causes the rocking-bar E to tip forward, bringing the tops of the shoes in contact with the wheels. When this pressure is relieved, the bar is caused to fall back, by the weight of the teeth and their load, from the wheel.

Having thus described my invention, what I claim, and desire to secure by Letters Patent, is—

The horse hay-rake provided with a treadle-lever, having the bent or shouldered staple, the guide K, jointed connecting-rods G, and rocking-bar E with its brake-shoes F, substantially as shown and described.

In testimony that I claim the above I have hereunto subscribed my name in the presence of two witnesses.

RALPH H. MARTINDALE.

Witnesses:
JOHN W. CARMICHAEL,
BARTHOLOMEW HODGES.